United States Patent
Cho et al.

(10) Patent No.: US 7,427,975 B2
(45) Date of Patent: Sep. 23, 2008

(54) DOUBLE WAVEFORM METHOD FOR DRIVING SIGNALS THROUGH A TRANSMISSION LINE

(75) Inventors: Evan Cho, Tucheng (TW); Chih-Hsin Hsu, Hsinchu Hsien (TW); Alex Tang, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 718 days.

(21) Appl. No.: 10/658,174

(22) Filed: Sep. 8, 2003

(65) Prior Publication Data

US 2004/0150488 A1   Aug. 5, 2004

(30) Foreign Application Priority Data

Jan. 30, 2003   (TW)   ............... 92102148 A

(51) Int. Cl.
*G09G 3/36* (2006.01)
*G09G 5/00* (2006.01)
*G06F 3/038* (2006.01)

(52) U.S. Cl. ........................ 345/95; 345/210

(58) Field of Classification Search ............ 345/94–97, 345/204, 87, 208–210; 315/169.1–169.4
See application file for complete search history.

(56) References Cited

U.S. PATENT DOCUMENTS

| | | | | |
|---|---|---|---|---|
| 5,459,495 A | * | 10/1995 | Scheffer et al. | ............. 345/690 |
| 5,966,111 A | * | 10/1999 | Koshoubu et al. | ............. 345/94 |
| 6,611,247 B1 | * | 8/2003 | Chang et al. | ................. 345/99 |

* cited by examiner

*Primary Examiner*—Amr Awad
*Assistant Examiner*—Stephen G Sherman
(74) *Attorney, Agent, or Firm*—J.C. Patents

(57) ABSTRACT

A double waveform method for driving a transmission line at an initial voltage to a final voltage is provided. The method includes finding a first voltage, a first maintenance period for the first voltage, a second voltage and a second maintenance period for the second voltage according to the initial voltage and the final voltage. The first voltage is put on the transmission line for a period equal to the first maintenance period. Thereafter, the second voltage is put on the transmission line for a period equal to the second maintenance period. Finally, the final voltage is put on the transmission line. With this transmission arrangement, a stable and correct signal voltage is transmitted through a transmission line faster.

12 Claims, 3 Drawing Sheets

DOUBLE WAVEFORM METHOD FOR DRIVING SIGNALS THROUGH A TRANSMISSION LINE

CROSS-REFERENCE TO RELATED APPLICATION

This application claims the priority benefit of Taiwan application Ser. No. 92102148, filed Jan. 30, 2003.

BACKGROUND OF THE INVENTION

1. Field of Invention

The present invention relates to a circuit transmission line. More particularly, the present invention relates to a double waveform method for driving signals through a transmission line.

2. Description of Related Art

Distortion of a signal after passing through a transmission line is one of the major engineering problems in data communication. Because each piece of transmission line has some electrical reactance, different degrees of capacitor effect will appear. In other words, intrinsic capacitance and resistance within the transmission line may trigger any passing voltage signals into characteristic capacitor charging/discharging. If the time constant for the resistance-capacitance (RC) coupling is high, transmission delay is longer and ultimately leads to a longer signal-stabilizing period. In many high-speed transmission environments, accurate reproduction and stability of transmitted voltage from one end of a transmission line to the other is important. For example, signal voltages must be transmitted to a flat panel display rapidly, accurately and in a stable condition. Any deviation in the signal voltages may result in serious errors. Furthermore, as size of the flat panel display is increased, deviation in electrical properties of the liquid crystals inside the panel will be higher. Because the distribution and organization of liquid crystals inside the flat panel display also will lead to some deviation in electrical properties as well, erroneous operation will occur more frequently in practice.

FIG. 1 is a diagram showing an equivalent circuit of a conventional transmission line. Assume a step voltage signal as shown in FIG. 1 needs to be transmitted across a transmission line. When a voltage signal is fed into point A in FIG. 1, the signal will pass by a capacitor 102 and resistor 112 pair, a second capacitor 104 and resistor 114 pair, a third capacitor 106 and resistor 116 pair, a fourth capacitor 108 and resistor 118 pair and so on in sequence before finally arriving at point B. Because the voltage signal has undergone a series of charging/discharging cycles, signal waveform at the output point B is the one shown in FIG. 3. As shown in FIG. 3, an initial voltage Vi input into point A will reach a stable final voltage Vf only after the passage of a period T. Moreover, since B is the most distant point from point A, the amount of voltage distortion will be most intense.

SUMMARY OF THE INVENTION

Accordingly, one object of the present invention is to provide a double waveform method of driving signals through a transmission line capable of increasing transmission speed while maintaining waveform stability and accuracy.

To achieve these and other advantages and in accordance with the purpose of the invention, as embodied and broadly described herein, the invention provides a double waveform method for driving a voltage signal through a transmission line with an initial voltage. First, a first voltage is applied to the transmission line and maintained for a first period. Thereafter, a second voltage is applied to the transmission line and maintained for a second period inside the transmission line. Finally, a final voltage is applied to the transmission line. The first voltage and the second voltage must not be equal to the final voltage. Moreover, the first voltage must not be equal to the initial voltage and the second voltage must not be equal to the final voltage. In addition, the first maintenance period for the first voltage and the second maintenance period for the second voltage must not be zero.

According to the preferred embodiment of this invention, if the final voltage is higher than the initial voltage, the first voltage or the second voltage is higher than the final voltage. On the other hand, if the final voltage is lower than the initial voltage, the first voltage or the second voltage is lower than the final voltage.

According to the preferred embodiment of this invention, a buffer may be deployed to drive the transmission line. The buffer is coupled to a digital-to-analogue converter and the digital-to-analogue converter is in turn coupled to a waveform encoder.

According to the preferred embodiment of this invention, the transmission lines can be any transmission line that feeds signals to a flat panel display.

In brief, this invention provides a double waveform method of driving a transmission line. The method utilizes the charging/discharging action in the equivalent capacitor/resistor elements spread out along the transmission line to bring the signal voltage at the end of the transmission line to the desired voltage level quickly and accurately. In other words, this method turns the disadvantaged electrical properties into an advantage so that the signal can be transmitted faster and stabilized quicker. Furthermore, the method can be applied to any circuit as long as a waveform needs to be transmitted through the circuit. Therefore, this invention is able to increase signal transmission speed and stabilize the transmitted waveform through a conventional transmission line.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
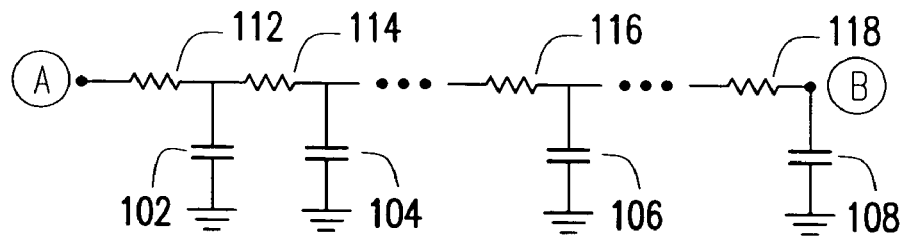
FIG. 1 is a diagram showing an equivalent circuit of a conventional transmission line.
Figure 2:
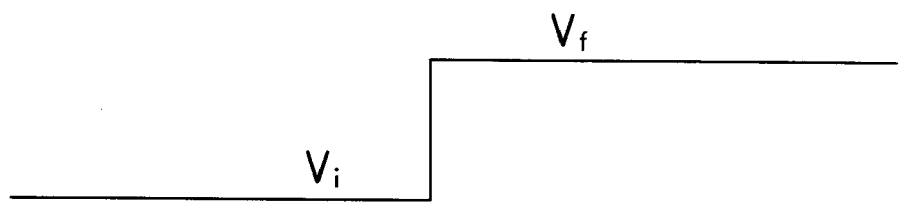
FIG. 2 is a diagram showing a signal waveform before feeding into a transmission line.
Figure 3:
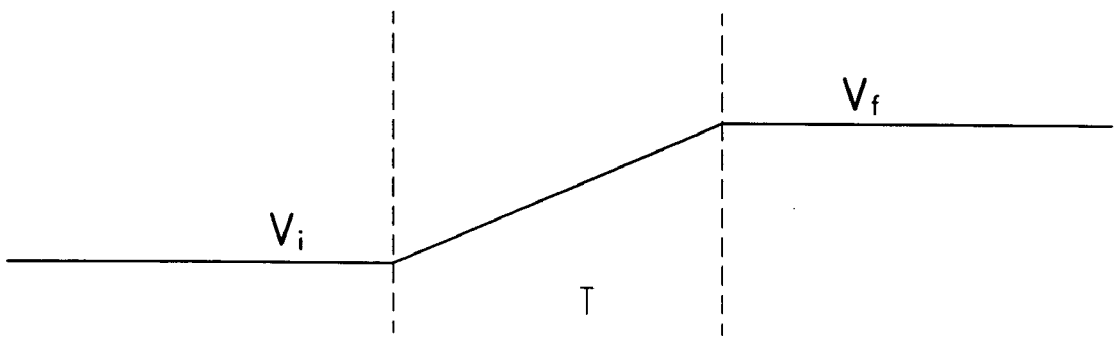
FIG. 3 is a diagram showing a signal waveform after passing through a transmission line.

Reference will now be made in detail to the present preferred embodiments of the invention, examples of which are illustrated in the accompanying drawings. Wherever possible, the same reference numbers are used in the drawings and the description to refer to the same or like parts.

Figure 4:
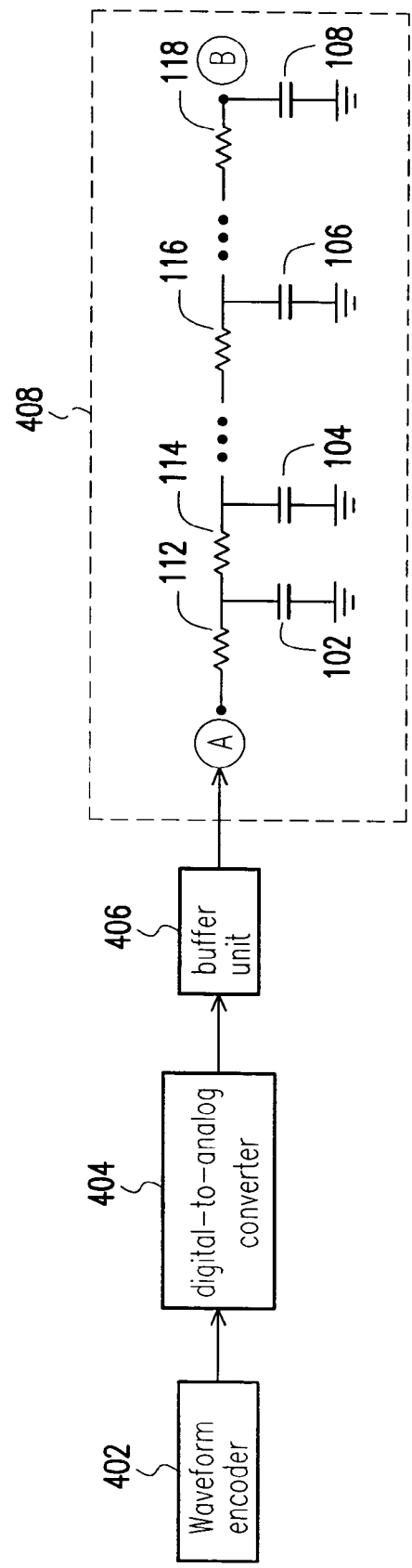
FIG. 4 is a block diagram showing the control elements and equivalent circuit diagram of the transmission line in a flat panel display circuit according to one preferred embodiment of this invention.

FIG. 4 is a block diagram showing the control elements and equivalent circuit diagram of the transmission line in a flat panel display circuit according to one preferred embodiment of this invention. The flat panel display in FIG. 4 includes a waveform encoder 402, a digital-to-analogue converter 404, a buffer 406 and a liquid crystal display panel 408. The waveform encoder 402 is coupled to the digital-to-analogue converter 404, the digital-to-analogue converter 404 is coupled to the buffer 406 and the buffer 406 is coupled to the liquid crystal display panel 408.

The waveform encoder 402 transmits digital data of pixels to the digital-to-analogue converter 404. The digital-to-analogue converter 404 converts the digital data into analogue data and then passes the analogue data to the buffer 406. The buffer 406 uses the analogue signals to drive the liquid crystal display panel 408. The buffer 406 can be an operational amplifier, for example.

The elements constituting the liquid crystal display panel 408 are identical to the equivalent circuit diagram in FIG. 1. The capacitors and resistors inside the liquid crystal display panel 408 represent the capacitance and resistance encountered when the transmission line and the liquid crystal inside the display panel are driven. Assume one needs to drive the voltage at a point B inside the liquid crystal display panel 408 from an initial voltage (Vi) to a final voltage (Vf). According to the voltage level Vi and Vf, one may find a set of parameters including a first voltage, a first maintenance period, a second voltage and a second maintenance period for driving the transmission line.

Figure 5:
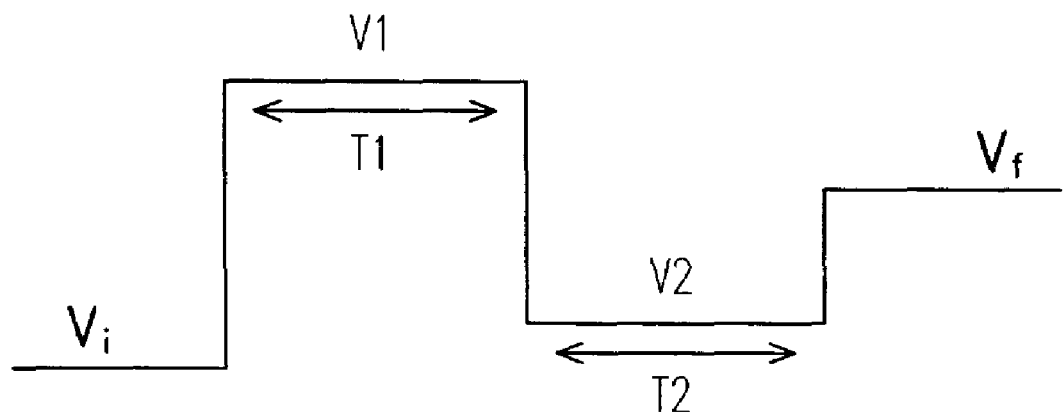
FIG. 5 is a diagram showing a signal waveform at the input end of a transmission line according to one preferred embodiment of this invention.
Figure 6:
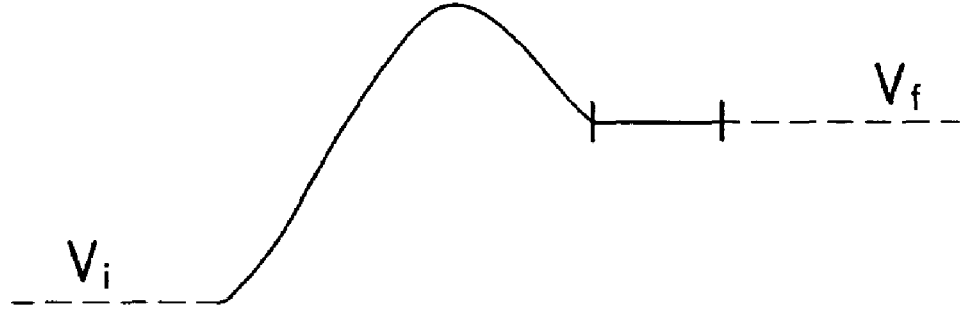
FIG. 6 is a diagram showing a signal waveform at the output end of a transmission line after passing the signal waveform shown in FIG. 5 through the transmission line.

FIG. 5 is a diagram showing a signal waveform at the input end of a transmission line according to one preferred embodiment of this invention. First, the buffer unit 406 provides a first voltage (V1) to point A and maintains the point A at the first voltage (V1) level for a first period (T1). During this period, the capacitors inside the liquid crystal display panel 408 begin to charge. Thereafter, the buffer unit 406 provides a second voltage (V2) to point A and maintains the point A at the second voltage (V2) level for a second period (T2). During this period, the capacitors inside the liquid crystal display panel 408 begin to discharge. Finally, the buffer unit 406 provides a final voltage (Vf) to the point A. Due to the charging and discharging of capacitor/resistor along the transmission line, the voltage level at point B is rapidly adjusted to Vf. FIG. 6 is a diagram showing a signal waveform at the output end (point B) after passing the signal waveform shown in FIG. 5 through the transmission line.

Note that the first voltage (V1) and the second voltage (V2) cannot be both at the same initial voltage level. Similarly, the first voltage (V1) and the second voltage (V2) cannot both be at the same level as the final voltage. In addition, the first voltage (V1) must not be equal to the initial voltage and the second voltage (V2) must not be equal to the final voltage. Furthermore, the first maintenance period (T1) and the second maintenance period (T2) must not be zero.

In conclusion, this invention provides a double waveform method for driving a voltage signal through a transmission line such that distortion due to RC delay is minimized and the traveling waveform is stabilized more quickly. Furthermore, using two waveforms to drive a voltage signal through a transmission line also reduces the time needed to reach a desired voltage level at a particular point along the transmission line. All in all, this invention reduces signal distortion and increases transmission speed along the transmission line.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A double waveform method for driving a transmission line originally at an initial voltage on the transmission line to a final voltage, the double waveform method comprising:
   finding a first voltage, a second voltage, a first voltage maintenance period and a second voltage maintenance period according to the initial voltage and the final voltage;
   applying putting up the first voltage on the transmission line for a time period equal to the first voltage maintenance period; and
   applying the second voltage on the transmission line for a time period equal to the second voltage maintenance period; and
   applying the final voltage on the transmission line,
   wherein if the final voltage is higher than the initial voltage, the first voltage is configured to be higher than the final voltage and the second voltage is lower than the final voltage, and if the final voltage is lower than the initial voltage, the first voltage is configured to be lower than the final voltage and the second voltage is higher than the final voltage.

2. The method of claim 1, wherein the transmission line is the transmission line on a flat display panel.

3. The method of claim 1, wherein a buffer unit is deployed to drive the transmission line.

4. The method of claim 3, wherein the buffer unit is coupled to a digital-to-analogue converter.

5. The method of claim 4, wherein the digital-to-analogue converter is coupled to a waveform encoder.

6. The method of claim 1, wherein a plurality of resistance-capacitance (RC) coupling units are serially interposed on the transmission line, wherein during the first voltage maintenance period, the first voltage is applied on the transmission line and the serially interposed RC coupling units are sequentially changing, and during the second voltage maintenance period, the second voltage is applied on the transmission line and the serially interposed RC coupling units are sequentially discharging.

7. A double waveform method for driving a signal through a transmission line comprising:
   putting a first voltage on the transmission line for a first period of time;
   putting a second voltage on the transmission line for a second period of time,
   wherein the first period of time and the second period of time are configured according to an initial voltage of the signal and a final voltage which is desired to be obtained on the transmission line; and putting a final voltage on the transmission line,
   wherein if the final voltage is higher than the initial voltage, the first voltage is configured to be higher than the final voltage and the second voltage is lower than the final voltage, and if the final voltage is lower than the initial voltage, the first voltage is configured to be lower than the final voltage and the second voltage is higher than the final voltage.

8. The method of claim 7, wherein the transmission line is the transmission lines on a flat display panel.

9. The method of claim 7, wherein a buffer unit can be deployed to drive the transmission line.

10. The method of claim 9, wherein the buffer unit is coupled to a digital-to-analogue converter.

11. The method of claim 10, wherein the digital-to-analogue converter is coupled to a waveform encoder.

12. The method of claim 7, wherein a plurality of resistance-capacitance (RC) coupling units are serially interposed on the transmission line, wherein during the first period of time, the first voltage is applied on the transmission line and the serially interposed RC coupling units are sequentially changing, and during the second period of time, the second voltage is applied on the transmission line and the serially interposed RC coupling units are sequentially discharging.

* * * * *